(12) United States Patent
Shen et al.

(10) Patent No.: US 9,858,402 B2
(45) Date of Patent: Jan. 2, 2018

(54) USABLE SECURITY OF ONLINE PASSWORD MANAGEMENT WITH SENSOR-BASED AUTHENTICATION

(71) Applicant: Microsoft Technology Licensing, LLC, Redmond, WA (US)

(72) Inventors: Guobin Shen, Beijing (CN); Fan Yang, Beijing (CN); Lidong Zhou, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 8 days.

(21) Appl. No.: 14/832,954

(22) Filed: Aug. 21, 2015

(65) Prior Publication Data

US 2016/0055328 A1 Feb. 25, 2016

Related U.S. Application Data

(63) Continuation of application No. 13/110,939, filed on May 19, 2011, now Pat. No. 9,141,779.

(51) Int. Cl.
*G06F 21/32* (2013.01)
*H04L 9/32* (2006.01)
(Continued)

(52) U.S. Cl.
CPC ............ *G06F 21/32* (2013.01); *H04L 9/0866* (2013.01); *H04L 9/32* (2013.01); *H04L 9/3231* (2013.01); *H04L 9/3271* (2013.01); *H04L 63/0815* (2013.01); *H04L 63/0861* (2013.01); *H04L 2209/805* (2013.01); *H04L 2463/082* (2013.01)

(58) Field of Classification Search
CPC ............................ G06F 21/41; H04L 63/0815
See application file for complete search history.

(56) References Cited

U.S. PATENT DOCUMENTS 5,689,638 A 11/1997 Sadovsky
6,720,860 B1 4/2004 Narayanaswami
(Continued)

OTHER PUBLICATIONS

Yang et al., "Cloud Password Manager Using Privacy-Preserved Biometrics", 2014, pp. 505-509.*
(Continued)

*Primary Examiner* — Thaddeus Plecha
(74) *Attorney, Agent, or Firm* — Rainier Patents, P.S.

(57) ABSTRACT

A multi-party security protocol that incorporates biometric-based authentication and withstands attacks against any single party (e.g., mobile phone, cloud, or the user). The protocol involves the function split between mobile and cloud and the mechanisms to chain-hold the secrets. A key generation mechanisms binds secrets to a specific device or URL (uniform resource locator) by adding salt to a master credential. An inline CAPTCHA (Completely Automated Public Turing test to tell Computers and Humans Apart) handling mechanism uses the same sensor modality as the authentication process, which not only improves the usability, but also facilitates the authentication process. This architecture further enhances existing overall system security (e.g., handling untrusted or compromised cloud service, phone being lost, impersonation, etc.) and also improves the usability by automatically handling the CAPTCHA.

20 Claims, 13 Drawing Sheets

(51) Int. Cl.
H04L 29/06 (2006.01)
H04L 9/08 (2006.01)

(56) References Cited

U.S. PATENT DOCUMENTS

| | | | |
|---|---|---|---|
| 6,920,561 B1* | 7/2005 | Gould | G06F 21/32 |
| | | | 713/156 |
| 8,621,583 B2 | 12/2013 | Yang et al. | |
| 9,141,779 B2 | 9/2015 | Shen et al. | |
| 2001/0047488 A1 | 11/2001 | Verplaetse et al. | |
| 2002/0038426 A1 | 3/2002 | Pettersson et al. | |
| 2003/0135740 A1 | 7/2003 | Talmor et al. | |
| 2003/0158815 A1 | 8/2003 | Yoshida et al. | |
| 2003/0163710 A1* | 8/2003 | Ortiz | H04L 63/0861 |
| | | | 713/186 |
| 2004/0192256 A1 | 9/2004 | Kuwajima | |
| 2004/0205176 A1 | 10/2004 | Ting et al. | |
| 2004/0230826 A1 | 11/2004 | Birkhoelzer et al. | |
| 2004/0249961 A1 | 12/2004 | Katsube et al. | |
| 2004/0268152 A1* | 12/2004 | Xia | H04L 63/0281 |
| | | | 726/5 |
| 2005/0138385 A1 | 6/2005 | Friedli et al. | |
| 2006/0242415 A1 | 10/2006 | Gaylor | |
| 2006/0279732 A1 | 12/2006 | Wang et al. | |
| 2007/0026372 A1 | 2/2007 | Huelsbergen | |
| 2007/0143824 A1 | 6/2007 | Shahbazi | |
| 2007/0186106 A1 | 8/2007 | Ting et al. | |
| 2007/0282757 A1 | 12/2007 | Pandya et al. | |
| 2007/0293194 A1 | 12/2007 | Bisht | |
| 2007/0297610 A1 | 12/2007 | Chen et al. | |
| 2007/0300307 A1 | 12/2007 | Duncan | |
| 2008/0031447 A1* | 2/2008 | Geshwind | H04L 9/0822 |
| | | | 380/46 |
| 2008/0059804 A1 | 3/2008 | Shah et al. | |
| 2009/0164795 A1 | 6/2009 | Justus et al. | |
| 2009/0205035 A1 | 8/2009 | Sermersheim et al. | |
| 2009/0210722 A1* | 8/2009 | Russo | H04L 9/0866 |
| | | | 713/189 |
| 2009/0217056 A1 | 8/2009 | Malpani | |
| 2009/0309698 A1 | 12/2009 | Headley et al. | |
| 2010/0017616 A1* | 1/2010 | Nichols | G06F 21/41 |
| | | | 713/183 |
| 2010/0037046 A1 | 2/2010 | Ferg et al. | |
| 2010/0049526 A1 | 2/2010 | Lewis et al. | |
| 2010/0115291 A1 | 5/2010 | Buer | |
| 2010/0153722 A1 | 6/2010 | Bauchot et al. | |
| 2010/0161927 A1 | 6/2010 | Sprouse et al. | |
| 2010/0186078 A1 | 7/2010 | Napoli et al. | |
| 2011/0093942 A1 | 4/2011 | Koster et al. | |
| 2011/0110364 A1* | 5/2011 | Fried | G06Q 30/02 |
| | | | 370/352 |
| 2011/0126280 A1* | 5/2011 | Asano | G06F 21/32 |
| | | | 726/19 |
| 2011/0252243 A1 | 10/2011 | Brouwer et al. | |
| 2011/0283338 A1 | 11/2011 | Yang et al. | |
| 2011/0314533 A1 | 12/2011 | Austin et al. | |
| 2012/0144457 A1* | 6/2012 | Counterman | H04L 9/3271 |
| | | | 726/5 |
| 2012/0249298 A1 | 10/2012 | Sovio et al. | |
| 2012/0284195 A1* | 11/2012 | McMillen | G06Q 20/3223 |
| | | | 705/71 |

OTHER PUBLICATIONS

"Amazon Elastic Compute Cloud (Amazon EC2)", retrieved from <<http://web.archive.org/web/20110301214026/http://aws.amazon.com/ec2/>> on Feb. 28, 2011, 14 pages.

"A web rolodex for your passwords!", retrieved from <<http://web.archive.org/web/20110314155634/http://www.alipperz.com/>> on Mar. 1, 2011, 1 page.

"Biometric authentication as a Service (BaaS) World's first biometric authentication service", retrieved from <<http://web.archive.org/web/20110313062855/http://www.bioid.com/assets/files/Flyer/Flyer-BaaS-201103-En-vFINAL-SCREEN.pdf>> on Mar. 4, 2011, 2 pages.

"Biometric Authentication for iPhone Apps", Aug. 3, 2010, retrieved from <<http://www.securityweek.com/biometric-authentication-iphone-apps>> on Mar. 4, 2011, 6 pages.

"Facer Credentialme™ Enables Biometric Authentication to Secure App for Smart Phone Security", Feb. 14, 2011, retrieved from <<http://www.findbiometrics.com/industry-news/i/8638/>> on Mar. 4, 2011, 2 pages.

"LastPass—Password Manager, Form Filler, Password Management", retrieved from <<http://web.archive.org/web/20110301210258/https://lastpass.com/>> on Feb. 28, 2011, 2 pages.

"Mobile/Fennec", retrieved from <<http://web.archive.org/web/20110612020405/https://wiki.mozilla.org/Fennec>> on Mar. 1, 2011, 3 pages.

"OpeniD Specifications", retrieved from <<http://web.archive.org/web/20110302054532/http://openid.net/developers/specs/>> on Feb. 28, 2011, 1 page.

"Password manager", retrieved from <<http://web.archive.org/web/20111004134510/http://en.wikipedia.org/wiki/Password_manager>> on Mar. 1, 2011, 2 pages.

"SSL Man in the Middle Proxy", retrieved from <<https://crypto.stanford.edu/ssl-mitm/>> on Feb. 28, 2011, 2 pages.

"The Mobile Internet Report: Ramping Faster than Desktop Internet, the Mobile Internet Will Be Bigger than Most Think", Dec. 15, 2009, retrieved from <<http://web.archive.org/web/20110623153733/http://www.morganstanley.com/institutional/techresearch/pdfs/Theme_2_Mobile_Ramping.pdf>>, 54 Pages.

"WebKit", retrieved from <<http://web.archive.org/web/20110309064706/http://en.wikipedia.org/wiki/WebKit>>on Mar. 1, 2011, 1 page.

"Windows Azure Platform", retrieved from <<http://web.archive.org/web/20110303074543/http://www.microsoft.com/windowsazure/>> on Mar. 1, 2011, 1 page.

Abadi et al., "Strengthening Passwords", SRC Technical Note 1997-033 Digital System Research Center, Sep. 1, 1997, 12 pages.

Adams, Anne and Martina Angela Sasse, "Users Are Not the Enemy", Communications of the ACM, vol. 42, Issue 12, Dec. 1999, 6 pages.

Atwood et al., "OAuth Core 1.0", Dec. 4, 2007, retrieved from <<http://oauth.net/core/1.0/>> on Feb. 28, 2011, 25 pages.

Aviv et al., "Smudge Attacks on Smartphone Touch Screens", Proceedings of the 4th USE NIX Conference on Offensive Technologies, Aug. 9, 2010, 10 pages.

Bowman et al., "Sensor based condition monitoring", Jun. 2009, retrieved from http://www.bridge-projecteu/data/File/BRIDGE_WP03_sensor_based_condition_monitoring.pdf>>, 95 pages.

Corner, Mark D. and Brian D. Noble, "Zero-Interaction Authentication", Proceedings of the 8th Annual International Conference on Mobile Computing and Networking, Sep. 23-28, 2002, 11 pages.

Diana, Alison, "Smartphones to Ring Up 28% of Holiday Shopping", Nov. 22, 2010, retrieved from <<http://www.informationweek.com/mobile/mobile-devices/smartphones-to-ring-up-28—of-holiday-shopping/d/d-id/1094358?>> on Oct. 24, 2012, 2 pages.

Gamboa et al., "Webbiometrics: User Verification via Web Interaction", Proceedings of Biometrics Symposium, 2007, IEEE, Sep. 11, 2007, 6 pages.

Gouda et al., "SPP: An anti-phishing single password protocol", IProceedings of International Journal of Computer and Telecommunications Networking, vol. 51, Issue 13, 2007, 12 pages.

Griffin, Joel, "Study: U.S. consumers would welcome voice verification", Feb. 6, 2009, retrieved from <<http://www.securityinfowatch.com/Financial/study-us-consumers-would-welcome-voice-verification>> on Feb. 28, 2011, 2 pages.

Halderman et al., "A Convenient Method for Securely Managing Passwords", Proceedings of the 14th International Conference on World Wide Web, May 10, 2005, 9 pages.

Inglesant, Philip and M. Angela Sasse, "The True Cost of Unusable Password Policies: Password Use in the Wild", Proceedings of the SIGCHI Conference on Human Factors in Computing Systems, Apr. 10-15, 2010, 10 pages.

(56) References Cited

OTHER PUBLICATIONS

Ives et al., "The Domino Effect of Password Reuse", Communications of the ACM—Human-Computer Etiquette, vol. 47, Issue 4, Apr. 2004, 4 pages.
Kelsey et al., "Secure Applications of Low-Entropy Keys", Proceedings of the First International Workshop on Information Security, Sep. 17, 1997, 14 pages.
Englert, Burkhard and Shah Pritesh, "On the Design and Implementation of a secure Online Password Vault," International Conference on Convergence and Hybrid Information Technology, Aug. 27-29, 2009, pp. 375-382.
Kinnunen et al., "Real-Time Speaker Identification and Verification", Proceedings of IEEE Transactions on Audio, Speech, and Language Processing, Jan. 2006, Joensun, Finland, 13 pages.
Liu et al., "uWave: Accelerometer-based Personalized Gesture Recognition and Its Applications", Proceedings of IEEE International Conference on Pervasive Computing and Communications, Mar. 9, 2009, 9 pages.
Lu et al., "M-Commerce Secured Using Web-enabled Mobile Biometric Agents", Proceedings of the 2007 IEEE/WIC/ACM International Conferences on Web Intelligence and Intelligent Agent Technology, Nov. 5, 2007, 4 pages.
Manber, Udi, "A Simple Scheme to Make Passwords Based on One-Way Functions Much Harder to Crack", Journal Computers and Security Archive, vol. 15, Issue 2, Nov. 1994, 6 pages.
Pocovnicu, Adrian, "Biometric Security for Cell Phones", Proceedings of Informatics Economical, vol. 13 No. 1, 2009, 7 pages.
Ross et al., "Stronger Password Authentication Using Browser Extensions", Proceedings of the 14th Conference on USE NIX Security Symposium, vol. 14, Jul. 31, 2005, 15 pages.
Saroiu, Stefan and Alec Wolman, "I am a Sensor, and I Approve This Message", Proceedings of the Eleventh Workshop on Mobile Computing Systems & Applications, Microsoft Research, Feb. 22-23, 2010, 6 pages.
Sasse, M. Angela and Ivan Flechais, "Usable Security Why Do We Need it? How Do We Get it?", Aug. 5, 2005, retrieved from <<http://hornbeam.cs.ucl.ac.uk/hcs/teaching/GA10/lec1extra/sasse_flechais_ch02.pdf>>, 18 pages.
Schneier, Bruce, "Password Safe the security of Twofish in a password database", retrieved from <<http://web.archive.org/web/20110107220212/http://www.schneier.com/passsafe.html>> on Mar. 1, 2011, 1 page.
Vance, Ashlee, "If Your Password Is 123456, Just Make It HackMe", Jan. 20, 2010, retrieved from <<http://www.nytimes.com/2010/01/21/technology/21password.html?scp=1&sq=passwords&st=cse>> on Mar. 1, 2011, 4 pages.
Non-Final Office Action dated Oct. 5, 2012 from U.S. Appl. No. 13/110,939, 32 pages.
Response dated Jan. 7, 2013 to Non-Final Office Action dated Oct. 5, 2012 from U.S. Appl. No. 13/110,939, 14 pages.
Final Office Action dated Feb. 14, 2013 from U.S. Appl. No. 13/110,939, 21 pages.
Response dated Jun. 13, 2013 to Final Office Action dated Feb. 14, 2013 from U.S. Appl. No. 13/110,939, 13 pages.
Non-Final Office Action and Examiner Initiated Interview Summary dated Jul. 16, 2014 from U.S. Appl. No. 13/110,939, 29 pages.
Response dated Oct. 17, 2014 to Non-Final Office Action dated Jul. 16, 2014 from U.S. Appl. No. 13/110,939, 16 pages.
Final Office Action and Examiner Initiated Interview Summary dated Jan. 15, 2015 from U.S. Appl. No. 13/110,939, 22 pages.
Response dated Apr. 20, 2015 to Final Office Action dated Jan. 15, 2015 from U.S. Appl. No. 13/110,939, 14 pages.
Notice of Allowance and Examiner Initiated Interview Summary dated May 18, 2015 from U.S. Appl. No. 13/110,939, 15 pages.
Notice of Allowance dated Jun. 22, 2015 from U.S. Appl. No. 13/110,939, 4 pages.
Non-Final Office Action dated May 11, 2012 from U.S. Appl. No. 12/780,584, 26 pages.
Response dated Aug. 9, 2012 to Non-Final Office Action dated May 11, 2012 from U.S. Appl. No. 12/780,584, 13 pages.
Final Office Action dated Jan. 4, 2013 from U.S. Appl. No. 12/780,584, 11 pages.
Response dated Jan. 9, 2013 to Final Office Action dated Jan. 4, 2013 from U.S. Appl. No. 12/780,584, 12 pages.
Non-Final Office Action dated Feb. 5, 2013 from U.S. Appl. No. 12/780,584, 9 pages.
Response dated Feb. 27, 2013 to Non-Final Office Action dated Feb. 5, 2013 from U.S. Appl. No. 12/780,584, 11 pages.
Notice of Allowance dated Jul. 24, 2013 from U.S. Appl. No. 12/780,584, 14 pages.

\* cited by examiner

USABLE SECURITY OF ONLINE PASSWORD MANAGEMENT WITH SENSOR-BASED AUTHENTICATION

BACKGROUND

The emergence of the mobile Internet, highly available cloud services, and mobile phones with rich on-phone sensing capabilities have significantly changed the landscape of mobile computing. Mobile Internet is gaining popularity with such magnitude that the number of users that connect to the Internet using mobile devices is expected to exceed that of desktop PCs within the few years.

Current security mechanisms that use passwords are appropriate for keyboard-equipped desktop PCs, but inconvenient for most mobile devices that typically have a much smaller form factor. As a best practice, secure websites unanimously enforce, or at least advise, the use of strong passwords that require both a minimum password length and diversity on the character set used (e.g., characters are a mix of upper and lower case letters, digits and non-alphanumeric characters). Stronger passwords improve security. However, it further increases the difficulty of inputting password on a mobile device, which usability drawbacks may eventually result in users counteracting practices, and hence, fail the original goal of security.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a multi-party security protocol that incorporates biometric based authentication and withstands attacks against any single party (e.g., mobile phone, cloud, or the user). The protocol involves the function split between mobile and cloud and the mechanisms to chain-hold the secrets. A key generation mechanisms binds secrets to a specific device or URL (uniform resource locator) by adding salt (e.g., random bits as one input to a one-way function) to a master credential. An inline CAPTCHA (Completely Automated Public Turing test to tell Computers and Humans Apart) handling mechanism uses the same sensor modality as the authentication process, which not only improves the usability, but also facilitates the authentication process. A user friendly interface is also provided.

This architecture further enhances existing overall system security (e.g., handling untrusted or compromised cloud service, phone being lost, impersonation, etc.) and also improves the usability by automatically handling the CAPTCHA.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
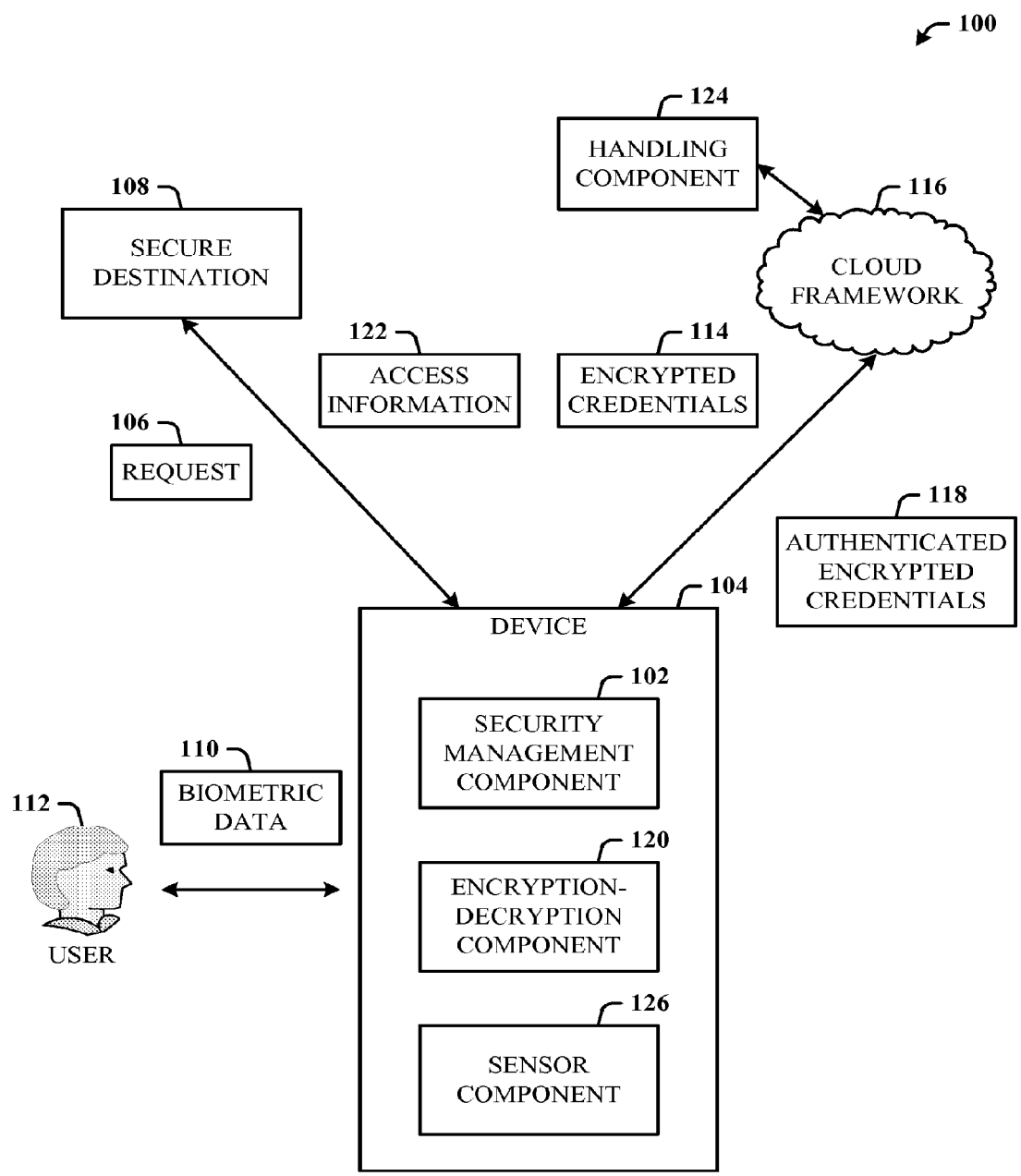
FIG. 1 illustrates a security system in accordance with the disclosed architecture.

Biometric information is now readily available from a number of different devices and in different forms. Thus, biometric-based authentication using sensors on cell phones, for example, provides a balance between security and usability. Mobile computing can be regarded as involving three separate parties: mobile phone, cloud, and user. Separation of these three lends itself to a three-party security protocol that incorporates biometric-based authentication and withstands attacks against any single party.

The disclosed architecture utilizes these three parties to enable user-friendly and secure mobile web access. Firstly, the use of biometric-based authentication strikes a balance between usability and security. This is particularly appropriate given the ever increasingly rich set of sensors that are now available, including on mobile devices. The proposed biometric authentication need not replace existing password-based authentication. Rather, the disclosed biometric authentication architecture can be used as an enhancement to the existing systems with improved usability and security.

Secondly, the architecture embraces the separation of mobile devices, users, and the cloud for security. A principal security challenge in mobile-cloud computing is that trust cannot be placed entirely on mobile devices (as such devices are susceptible to loss) or on the cloud (as the cloud may not be completely trustworthy). Rather, the architecture employs a security protocol that utilizes the physical separation of the three parties, where a user uses biometric authentication for self-identification, a cloud is used to store encrypted credentials, and the corresponding keys on mobile devices. In contrast to a conventional approach of using a cloud for computation offloading, the disclosed architecture uses a cloud for usability and security.

The architecture framework can accommodate different biometric authentication mechanisms, and is compatible with the current interactions between a client and a web service, in that eventually the same password-based credentials are supplied for authentication. This allows the architecture to be adopted without requiring any changes on web services.

Thirdly, for websites that use CAPTCHA (Completely Automated Public Turing test to tell Computers and Humans Apart) to distinguish real users from attacks from "robots", the architecture allows users to handle CAPTCHA input by piggybacking on the user authentication process. Both authentication and recognition are performed on user actions, where authentication identifies a user using biometrics and recognition extracts the CAPTCHA input. For example, when using voice-based biometric authentication, the user is prompted to read the CAPTCHA and uses speech recognition to extract the input.

The disclosed architecture is an online password manager that utilizes biometric-authentication techniques (e.g., authentication through the biometric characteristics of human being such as face, voice, iris, vein, etc.), existing or otherwise, to maintain a mobile experience and at the same time increases the security level compared to traditional password managers.

The disclosed architecture reduces the risk of credential leakage as in traditional password managers by requiring users to pass the biometric-authentication before, at least, the automatic entry of user credentials (e.g., name, password, etc.). The devices that include a rich set of sensors, such as rich cell-phone sensors (e.g., camera and microphone) provide opportunities to utilize different biometric authentication techniques.

The disclosed architecture further relies on always-available cloud service(s) as a repository to maintain user credentials. There is no credential stored on the device (e.g., cell phone). Attackers cannot launch attacks to the storage system when having physical access to the phone. To address a concern of an untrusted cloud service, credentials are encrypted before deposited to the cloud repository. The key used to encrypt credentials, the encryption and decryption process, are all on the mobile device side. Therefore, the cloud is not able to eavesdrop the original credentials.

The disclosed architecture provides an improved user experience. The characteristics of human biometric are innate to users. The user does not need to remember anything to accommodate biometric authentication. For example, one way to input biometric information on a phone is simply to speak or take video clips. Thus, the burden in remembering and inputting the user name and password is reduced or eliminated entirely.

Additionally, name/password and CAPTCHA input is handled with one modality without sacrificing user experience. The same modality sensors are utilized to perform both authentication and CAPTCHA input.

Speech can be selected as a unified modality in one implementation. The system collects user voice to perform voice authentication and also performs speech recognition to handle CAPTCHA input. Other modalities such as face recognition are possible. Thus, a device can authenticate a user with face recognition and detect the CAPTCHA through the movement of the lips. An accelerometer and/or gyroscope can also be employed to capture user handwritings from which a user can be authenticated and CAPTCHA being recognized at the same time.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a security system 100 in accordance with the disclosed architecture. As a general summary as to operation of the system 100 for a cell phone, for example, a user is prompted to input biometric data when attempting to access a secure website. The biometric data is captured by cell phone sensors. Authentication of the biometric data is then performed in the cloud. Authenticated encrypted credentials are returned from the cloud to the cell phone. The phone decrypts the credentials and uses a username and password to log-in to the secure website.

Upon encountering a secure web page that requires a user credential (e.g., a username and corresponding password), a cloud service is contacted. The service requests the user to input biometric data. The biometric data is captured by the corresponding on-premise (device and or local external to the device) sensors and sent to the cloud side for authentication. If the user passes the bio-authentication, the corresponding encrypted credential is returned. The device then uses the on-phone key to decrypt it, automatically fill the derived user name and password into the corresponding fields of the web page, and submit to the original secure website.

During the process, the mobile user does not need to input any text-based password using the cumbersome on-phone keyboard. Instead, the user performs biometric-based authentication by video/audio recording, or other modal inputs.

The architecture employs separation of secrets. In other words, the credential is not stored on the user device (e.g., phone), but maintained on the cloud side. This reduces the risk of physical attack when the device is lost or stolen. The credential is encrypted when shipped to the cloud, so the cloud does not have the plain text, and the key for the credential encryption is not known to the cloud and employed on the mobile side. This reduces the concern on the untrusted cloud service. Moreover, the biometric information is held on the cloud side. The user device does not store the bio-information. Thus, attackers cannot obtain the biometric information by accessing the phone physically.

More specifically, the system 100 can include a security management component 102 (e.g., which includes a password manager) of a device 104 that processes a request 106 for access to a secure destination 108. In response to the access, the security management component 102 generates biometric data 110 of a user 112 of the device 104 in response to the request 106. The security management component 102 encrypts the biometric data 110 as encrypted credentials 114.

A cloud framework 116 performs authentication of the encrypted credentials 114 received from the device 104, and sends authenticated encrypted credentials 118 to the device 104. An encryption-decryption component 120 of the device provide encryption-decryption processing such as for decrypting the authenticated encrypted credentials 118 to provide access information 122 to access the secure destination 108.

The biometric data 110 is stored (e.g., maintained during the time of registration) only on the cloud framework 116, the encrypted credentials 114 are stored (e.g., maintained during the time of registration) only on the cloud framework 116, and a decryption key for decrypting the authenticated encrypted credentials is stored (e.g., maintained during the time of registration) only on the device 104. The request 106 is received in response to access to a secure webpage of the secure destination 108, and the access information 122 includes a username and a password that are automatically input to access the secure destination 108. The encrypted credentials 114 are encrypted using a key created based on a master credential and domain information of the secure destination 108, and the key is correlated to the device 104.

The cloud framework 116 includes an inline CAPTCHA (Completely Automated Public Turing test to tell Computers and Humans Apart) handling component 124 that concurrently presents a random challenge and the CAPTCHA to the user 112, via the device 104 (which can be a mobile phone). The response to both the random challenge and the CAPTCHA is via a single sensor type (e.g., voice only, gesture only, etc.).

The cloud framework 116 includes a credential database that stores credentials, a model database of biometric models, and a layout database that stores parsed webpage login element information. The device 104 includes a browser plug-in that intercepts a login process to the secure destination 108, analyzes webpage content to obtain a code input field, renders an authentication interface, and performs automatic form filling.

The system 100 can further comprise a sensor component 126 that includes local sensors which sense user biometrics related to at least one of face, voice, iris, or vein, and output sensor data as the biometric data 110. The sensor component 126 performs recognition of a user interaction, and the security management component 102 prompts for further user input related to a type of the user interaction. In other words, if the user interaction is speech, the further user input prompted by the system 100 is also speech-based input.

The device 104 can optionally employ a security component (not shown) for opting in or out of exposing personal information by way of the sensor component 126. The security component allows the subscriber to opt-in and opt-out of the capture of tracking information (e.g., geolocation) as well as personal information that may be obtainable. The user can be provided with notice of the collection of personal information, for example, and the opportunity to enable or deny consent to do so. Consent can take several forms. Opt-in consent imposes on the user to take an affirmative action before the data is collected. Alternatively, opt-out consent imposes on the user to take an affirmative action to prevent the collection of data before that data is collected.

The architecture ensures the co-presence of all the three legitimate parties (user, device, and cloud) before credentials can be retrieved. This is achieved by applying a physical separation principle. In a mobile device implementation, there are three parties involved in the overall work flow of the system, the user, the mobile device, and the cloud. The functionalities of a conventional password manager are now split between the mobile device and the cloud, and security is enhanced by the physical separation principle. Only from chain-holding of all the secrets can the system retrieve the website credentials.

The cloud side plays two roles. Firstly, the cloud serves as the central repository of user credentials. Secondly, the cloud performs biometric verification, and hence, also holds a repository of user biometric models. The mobile device also plays two roles accordingly. The device collects user biometrics via its sensors (and perhaps external sensors via short range wireless communications with the device), and performs pre-processing for performance optimization. The device can also perform automatic form filling when the credential is successfully retrieved from the cloud side.

The split between the user device and cloud has two manifests: the functionality of a conventional password manager, and the biometric authentication process. The split in the manager offers a possibility to handle an untrusted cloud and mitigates the possible information leakage when the device gets lost or the cloud is compromised. The split in the biometric authentication allows the incorporation of complex algorithms in the device-cloud computing for higher biometric detection accuracy, using the rich in-cloud computing resources.

With the device-cloud split, the co-presence of the device and cloud is enforced by content encryption. Credentials stored on the cloud side are encrypted while the encryption/decryption key is held by the device. Biometric authentication is performed to ensure the presence of the correct user. Only when the user passes the biometric authentication will the cloud return encrypted credentials.

Figure 2:
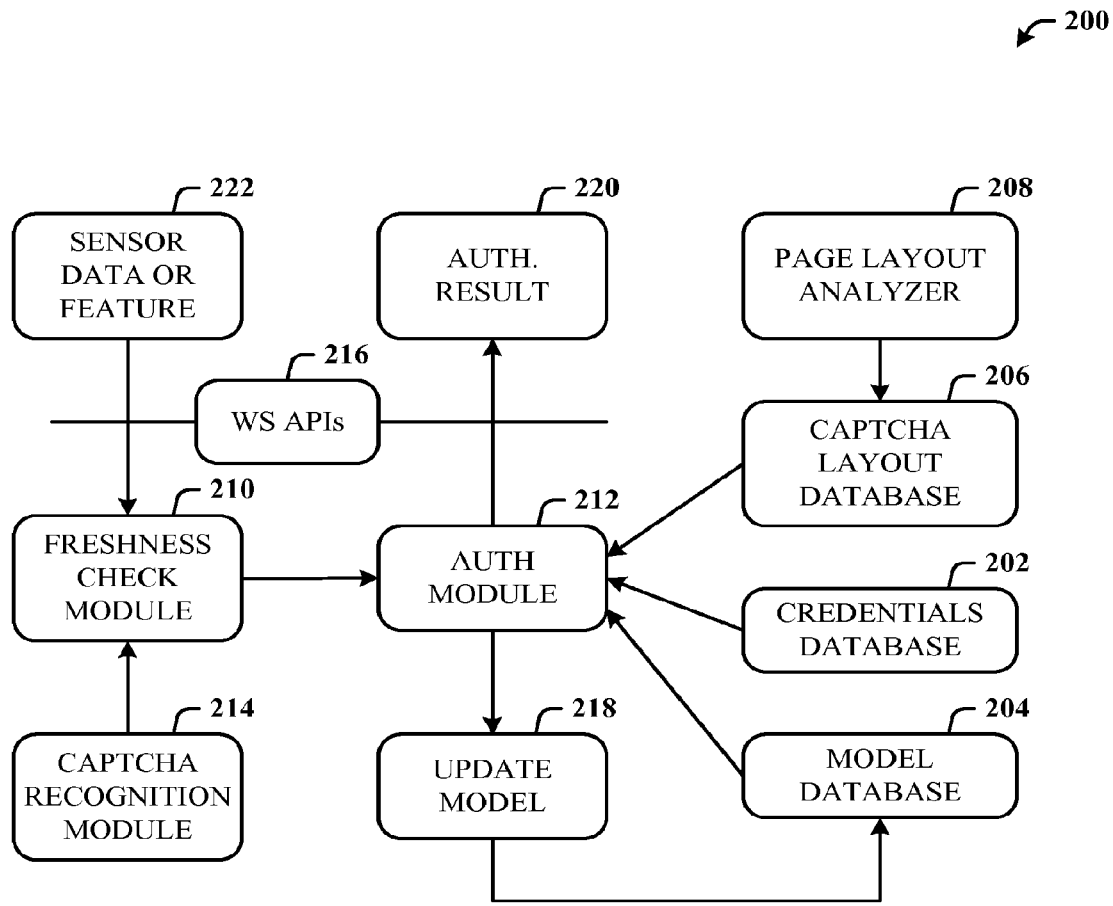
FIG. 2 illustrates security in a cloud framework in accordance with the disclosed architecture.

FIG. 2 illustrates security in a cloud framework 200 in accordance with the disclosed architecture. The cloud framework 200 includes three data repositories (also referred to a databases): a credentials database 202 that stores credentials, a model database 204 that stores user biometric data, and a CAPTCHA layout database 206 that stores the page layout of the secure website, as obtained from a page layout analyzer 208. The cloud framework 200 can also include three function modules: a freshness check module 210 that checks freshness of the biometric input, an authentication module 212 that performs biometric authentication, and a CAPTCHA recognition module 214 that conducts page layout analysis. The CAPTCHA recognition module 214 A server 216 provides a set of web service APIs (WS API) to the device for bio-authentication. The authentication module 212 provides input tho a model update module 218, to further update the model database 204 of model stored therein. An output of the authentication module 212 is an authentication result 220, which is passed to the device. The device includes the sensor component 126 (of FIG. 1), which provides sensor data or device features 222 to the freshness check module 210 for freshness checks.

In other words, the credential repository is a collection of URL indexed credential records. Each record can be in the format of [f(url), f(DevID), $K_{enc}$(credential)], where $K_{enc}$ is an encryption key, described in detail hereinbelow. The biometric model repository stores various biometric models, together with the associated feature parameters and the decision thresholds for the specific bio-authentication means.

The freshness check module 210 scrutinizes the freshness of the user's biometric data. If there is CAPTCHA on the login page, the freshness check module 210 generates random challenges suitable for the chosen sensor modality. Upon receiving responses from the device, the freshness check module 210 recognizes the random challenge and compares it against a ground truth. The biometric authentication module 212 will only perform the user verification if the freshness check passes.

The page layout analyzer 208 parses the login pages of all the secure websites the user has registered, and extracts the HTML (hypertext markup language) elements of the input field name or identifier (ID) for username, password, and CAPTCHA, and the position of these fields in a DOM (document object model) tree. Such information is stored in the layout repository.

The device communicates to the cloud through the WS APIs. The communication can be protected using SSL (secure socket layer). Additionally, the Hash(DevID) is mandatory parameter in all of the WS APIs, which discourages a random scanning attack. Absent this parameter, an attacker might be able to easily hit victim systems through scanning using randomly grabbed biometric signals, due to relatively low entropy of biometric signals.

Figure 3:
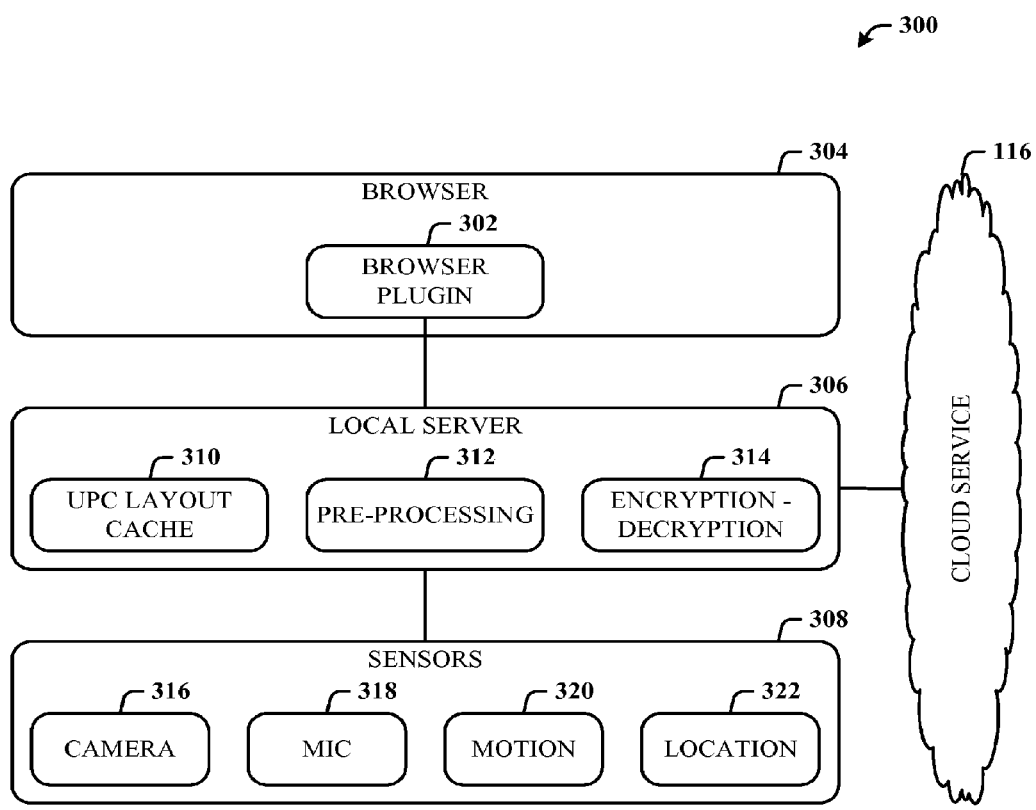
FIG. 3 illustrates an exemplary security software system for use on the client side.

FIG. 3 illustrates an exemplary security software system 300 for use on the client side. The client-side software enables direct access of hardware sensors from within a browser (e.g., mobile). (Another solution may include the use of HTML5 in the client device browser.) In this implementation, a combination of a browser plug-in 302 of a device browser 304 and a local web server 306 is employed. The browser plug-in 302 can access the raw content of a secure webpage (since the content is already decrypted). The plug-in 302 intercepts the login process, analyzes the page content to obtain the CAPTCHA input field, renders the authentication user interface, and performs automatic form filling. The local server 306 accesses local hardware sensors 308, communicates with the cloud framework 116 (also called service), and performs encryption/decryption. The local server 306 can also perform certain pre-processing and/or feature extraction to speed-up the whole process.

Accordingly, the local server 306 can include a CAPTCHA layout cache 310, a pre-processing module 312, and an encryption/decryption module 314. The sensors 308 can include many common sensors typically employed with the user device such as a camera 316 (video or still), microphone 318, motion sensor 320 (e.g., accelerometer, tilt, etc.), and location sensor 322 (e.g., geolocation subsystem such as GPS (global positioning system)).

In an alternative implementation that is not browser-specific, similar results can be achieved by deploying an SSL proxy to hijack the original HTTPS (hypertext transfer protocol secure) session and split the session into two HTTPS sessions.

Figure 4:
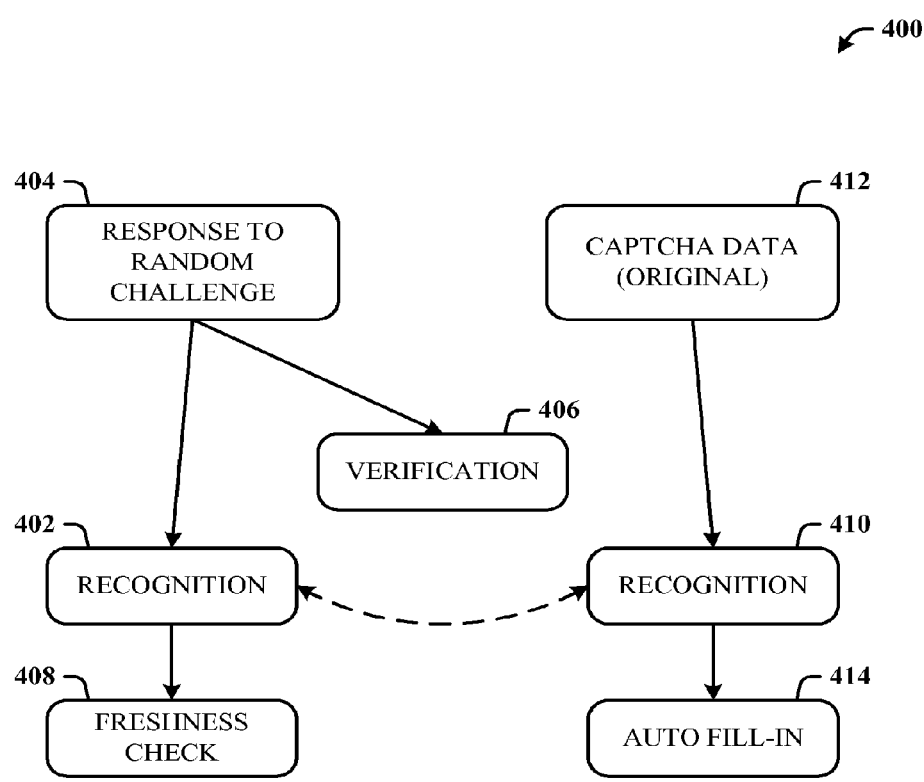
FIG. 4 illustrates an exemplary inline CAPTCHA handling system.

FIG. 4 illustrates an exemplary inline CAPTCHA handling system 400. The CAPTCHA system is inline in that the CAPTCHA input is handled within the process of biometric authentication (bio-authentication) using one modality of sensor input, without interruption. During the bio-authentication, one or more random challenges and the CAPTCHA are displayed to the user concurrently. The user inputs the challenges and CAPTCHA using one type of sensor (e.g., microphone, accelerometer). For example, if the user employs gesture as the authentication method, the system 400 can attempt recognition of the CAPTCHA via handwriting recognition.

The inline CAPTCHA handling system 400 improves the user experience. Additionally, since the ground truth of the response is known to the cloud, the random challenge can serve to train biometric data, which the cloud can accumulatively utilize to incrementally improve the recognition accuracy for the CAPTCHA input.

The inline CAPTCHA handling system 400 is described in a voice authentication example. The user reads both the random challenge sent from the cloud service and the CAPTCHA sent from the website of interest. Using voice input, the cloud side performs the following tasks: recognition 402 of the random words via speech recognition, as provided as a response 404 to a random challenge, and performs verification 406 of the correctness of the voice response 404. If the sensor data is correct, a freshness check 408 is passed. If voice verification 406 is successful, then CAPTCHA recognition 410 is performed on CAPTCHA data 412. The user's voice for random words may be used as on-the-fly training data. The credential and CAPTCHA recognition result are both returned to the client for processing and auto fill-in 414.

Figure 5:
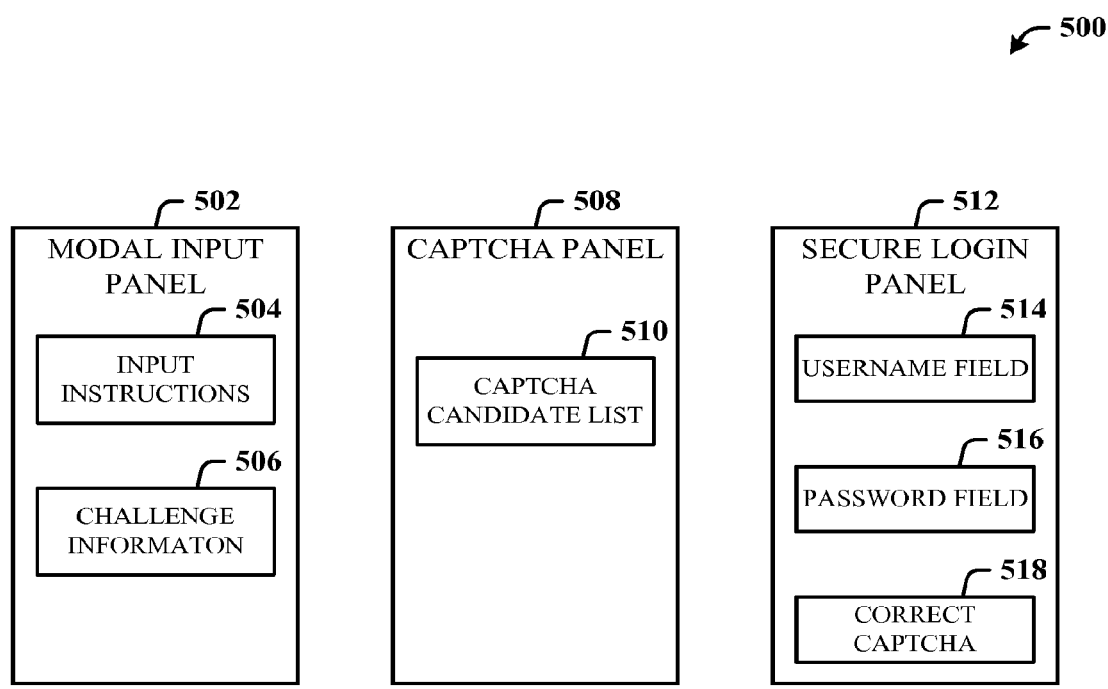
FIG. 5 illustrates a user interface for random challenge and CAPTCHA input.

FIG. 5 illustrates a user interface 500 for random challenge and CAPTCHA input. The user interface 500 is described in terms of voice recognition and authentication as the modal input. A model input panel 502 can be a popup window that prompts for user input. In this example, the modal input panel 502 can present input instructions 504 as to what modal input is to be used and challenge information 506 as to the user response (e.g., spoken letters, characters, words, etc.) to the challenge.

A CAPTCHA panel 508 can be a pop-up window that presents CAPTCHA output as multiple possible recognition results for viewing by the user at the client device. Presentation can be ranked candidate list 510 with the most likely candidate at the top. The user selects the correct candidate from the list 510, and continues the login process. If no selection in the list 510 is correct, the user will need to perform a correction such as repeating the process to make the correct selection. Finally, the credential and CAPTCHA are automatically filled-in on the target webpage, as shown in a secure login panel 512 of the web service. The credentials can include auto-entry of a username in a username field 514, auto-entry of a password in a password field 516, and presentation of the correct CAPTCHA 518.

Following is a description of secrets chain-holding and key generation for both encryption/decryption and registration.

The disclosed architecture includes biometric data ($K_{bio}$) of the real user, a key ($K_{enc}$) for encryption/decryption of credentials (assumes the use of symmetric key cryptography), and a device token (Token). The three parties in play include the device user, the device, and the cloud. According to a threat model, any party can be untrusted (e.g., the device user can be an impostor).

According to the physical separation principle, $K_{bio}$ is held by the cloud, $K_{enc}$ is held by the device, and Token is held by a user. Only when the correct $K_{bio}$, $K_{enc}$, and the Token are all present, can the architecture retrieve the plaintext of the credentials.

With respect to key generation, when a user registers with the disclose security architecture, the user chooses a master credential (MC) (the master credential is secured and used for input when registering, unregistering, and in rescue mode) that comprises an ID (e.g., a unique ID such as an email address) and a strong passcode. The MC and the domain name of the targeted website (URL) are used as a seed to generate $K_{enc}$;

$$K_{enc}=f(\text{concat}(URL,MC))$$

where concat( ) is to concatenate two strings, and f( ) is a secure cryptographic hash function (e.g., SHA-1). The key $K_{enc}$ is then used for credential encryption and decryption.

To register and unregister a device such as a mobile phone, the architecture uses the master credential (MC) to generate a registration key, $K_{reg}$, which is defined as, $$K_{reg}=f(\text{xor}(MC,DevID))$$

where DevID is a unique device ID (e.g., IMEI (international mobile equipment identity) number). The registration key $K_{reg}$ is stored only on the cloud side. The registration key is sent to security service of the cloud framework at device registration time. The cloud service uses $K_{reg}$ to unregister a device from the security service. The registration key $K_{reg}$ is also a rescue means for the user to authenticate the user by conventional password authentication, when the user fails the biometric authentication. In this rescue mode, the device uses a different encryption strategy: the device first derives the plaintext of $K_{reg}$ from MC (which is input by the user). The device further encrypts the plaintext using $K_{reg}$ (instead of $K_{enc}$ so that the server can decrypt it) and sends the encrypted credentials to the server. The server compares the decrypted content against its own copy.

Note that, salt (DevID and URL) has been added when generating $K_{reg}$ and $K_{enc}$. DevID correlates $K_{reg}$ not only to MC, but also the mobile device. Thus, this discourages random guess on the MC across multiple security users.

Incorporating website's URL in generating $K_{enc}$ avoids a "crack one for all" effect, since now, each secure site has a different encryption key. Incorporating the URL also reduces the risk when users reuse the password extensively across multiple websites.

Following is a general description of a threat model. The physical separation of the encryption key ($K_{enc}$), biometric data ($K_{bio}$), and the device token (Token) to different parties ensures that the absence of any party in the chain will fail the retrieval of the original credential.

For the threat of the client device being lost/stolen, since no password is stored on the device, there is no worry about the credential leak. The malicious phone holder does not possess $K_{bio}$, hence the holder cannot retrieve the credential from the cloud. If the holder launches a random attack to the cloud using the device, the cloud can lock the device for a certain number of retries.

For the untrusted cloud threat, as the credential is encrypted, the attacker cannot retrieve the plaintext. Moreover, the addition of salt to generate keys makes it more difficult to for the system to be cracked.

With respect to spoofing the biometric data, the freshness process of the $K_{bio}$ provides a means for defeating this attack. The architecture can adopt the standard challenge-response method to ensure the fresh capture of biometric data. The user finishes the biometric data input within a predefined period of time. Hence, simply forging and replaying stale biometric data cannot break the system. Moreover, even if the attacker successfully spoofs the bio-authentication mechanism, it is similar to that of the untrusted cloud case, which does not immediately result in information leakage thanks to the separation of secrets. Thus, the disclosed architecture demonstrates improved security over conventional biometric authentication systems.

Additionally, a key revocation mechanism is provided that allows use of the master credential MC to configure the cloud service to stop further access from the lost device to protect user credentials when both the device is stolen and the biometric signal is also spoofed by the same attacker.

Figure 6:
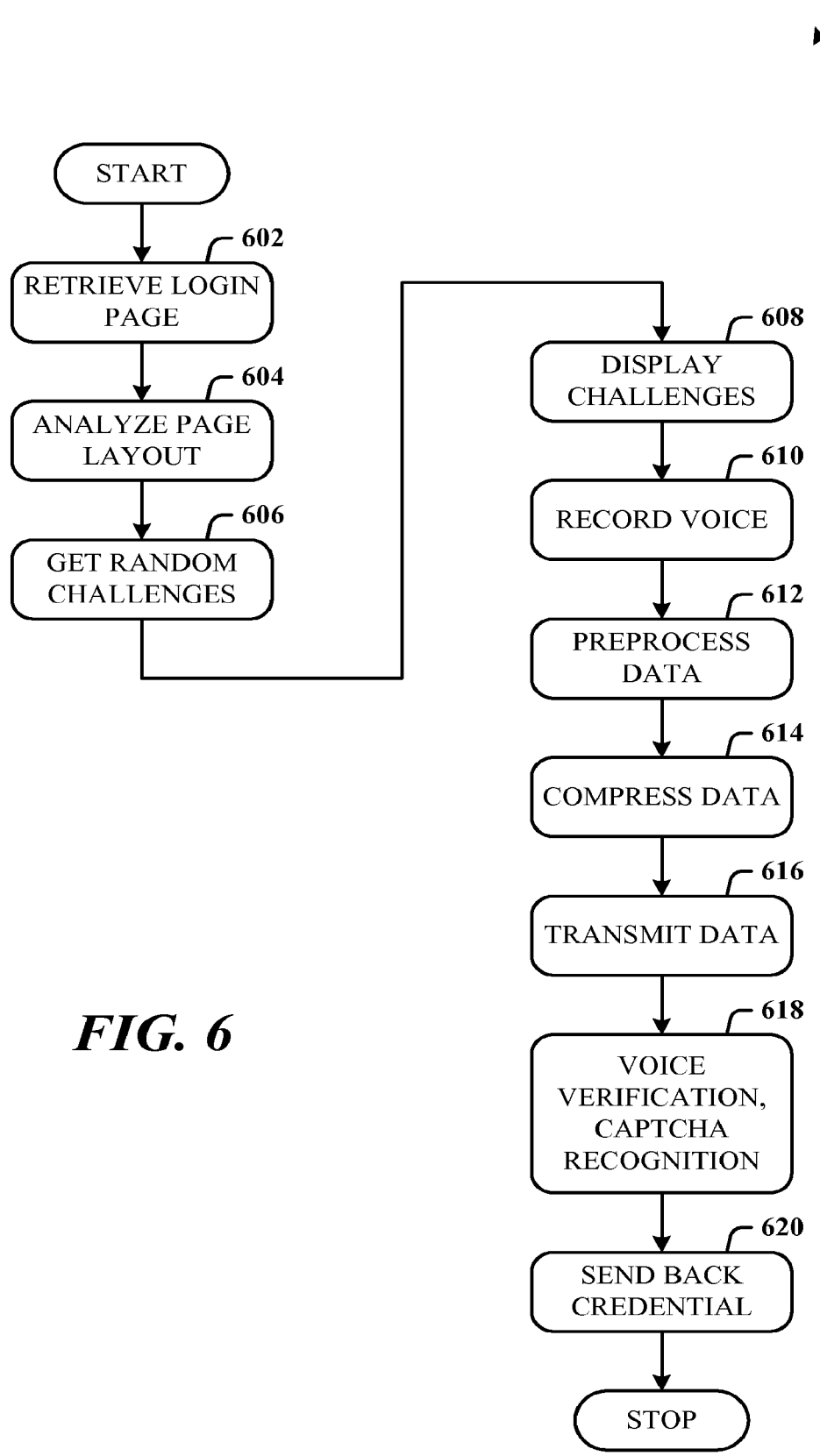
FIG. 6 illustrates a sequential work flow diagram of the security architecture for voice verification and recognition using a mobile device.

FIG. 6 illustrates a sequential work flow diagram 600 of the security architecture for voice verification and recognition using a mobile device. Initially, the security architecture renders the received CAPTCHA (from the targeted secure website) and the random challenge from cloud service, in one page (FIG. 5). The rendering action depends on the CAPTCHA, the challenge word, and the CAPTCHA layout information stored in the cloud. The system parallelizes the requests from the mobile device to the targeted website and the cloud service. The retrieval of CAPTCHA, analysis of layout of the login webpage, and the generation of random challenge can be executed in parallel.

According to the diagram 600, the mobile device retrieves a login page based on access request of the secure website, as indicated at 602. Upon receiving the request from the mobile device, the cloud page layout analyzer (208 of FIG. 2) emulates a mobile request to the targeted secure website, analyzes the layout of returned pages to identify the HTML element of the CAPTCHA fields and the node positions of these fields in the DOM tree, as indicated at 604. The information is saved to the page layout repository (layout database 206) and also sent back to the mobile device, along with the random challenges of suitable length. Since websites rarely change the login page layout, for consistent user experience, page layout analysis is lazily performed, on a daily basis, for example. The page layout repository (layout database 206) saves an on-demand request to the specific requested secure website. Note that, the page layout information is user independent, and hence, can be shared among all architecture users.

At 606, random challenges are obtained. At 608, the random challenges are presented. At 610, the user voice is recorded as biometric data. At 612, the voice biometric data is pre-processed (e.g., silence detection and removal, and self normalization). At 614, the biometric data is compressed for transmission. At 616, the compressed data is transmitted. At 618, voice verification and CAPTCHA recognition is performed. At 620, an authenticated credential is sent back to the mobile device.

Figure 7:
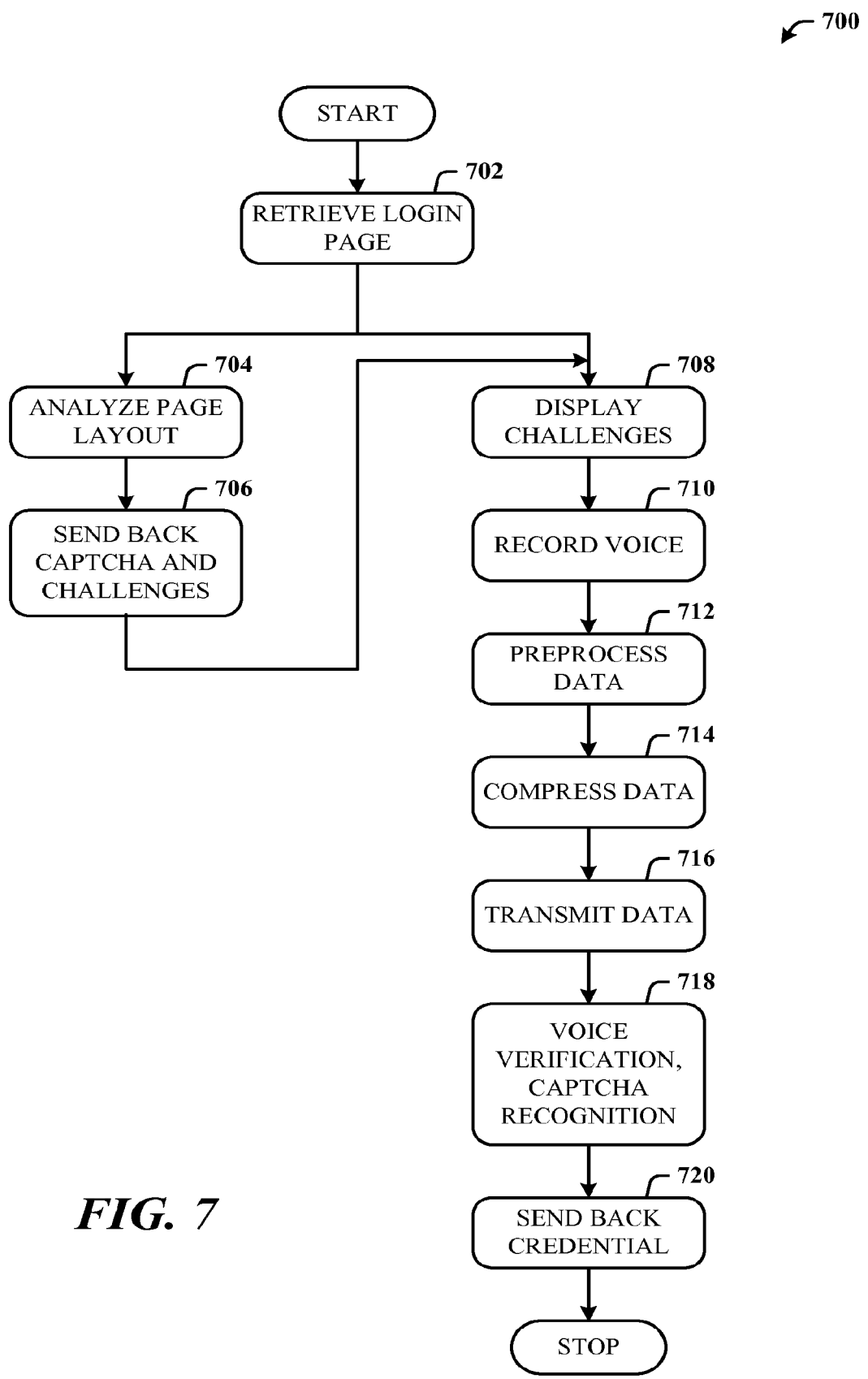
FIG. 7 illustrates an optimized sequential work flow diagram of the security architecture for voice verification and recognition using a mobile device that exploits parallelism.

FIG. 7 illustrates an optimized sequential work flow diagram 700 of the security architecture for voice verification and recognition using a mobile device that exploits parallelism. The diagram exploits parallelism among sub-tasks and also shifts certain tasks to the cloud. The averaged effect of parallelizing requests over WiFi (wireless fidelity), 3G ($3^{rd}$ generation mobile telecommunications), and GPRS (general packet radio service) network provides enhanced performance.

Pipelining is another way to exploit parallelism. The audio signal is usually processed on a frame-by-frame basis and has no temporal dependency. The processing stages can be pipelined. The pre-processing 312 involves at least two function modules: silence detection and removal using a zero-crossing algorithm, and self normalization that adapts the voice signal to the noise floor. Additionally, a standard AMR (adaptive multi-rate) codec (coder/decoder) can be utilized to compress the resulting voice segments before transmission.

In this flow diagram 700, parallelism involves retrieving the login page. In one leg of the diagram 700, the login page is retrieved, at 702. At 704, the layout of the page is analyzed. At 706, CAPTCHA and challenges are sent back. While this processing occurs, the login page retrieval, at 702, also occurs to prepare for display of challenges, at 708. At 710, the user voice is recorded as biometric data. At 712, the voice biometric data is pre-processed (e.g., silence detection and removal, and self normalization). At 714, the biometric data is compressed for transmission. At 716, the compressed data is transmitted. At 718, voice verification and CAPTCHA recognition is performed. At 720, an authenticated credential is sent back to the mobile device.

FIG. 6 and FIG. 7 describe flow for application of the disclosed architecture to voice verification and recognition. However, it is to be understood that this is only one application, and can be generalized to other modalities. For example, block 610 can capture sensor data, and thus, block 618 is then biometric verification and CAPTCHA recognition. This applies similarly to blocks 710 and 718 of FIG. 7.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
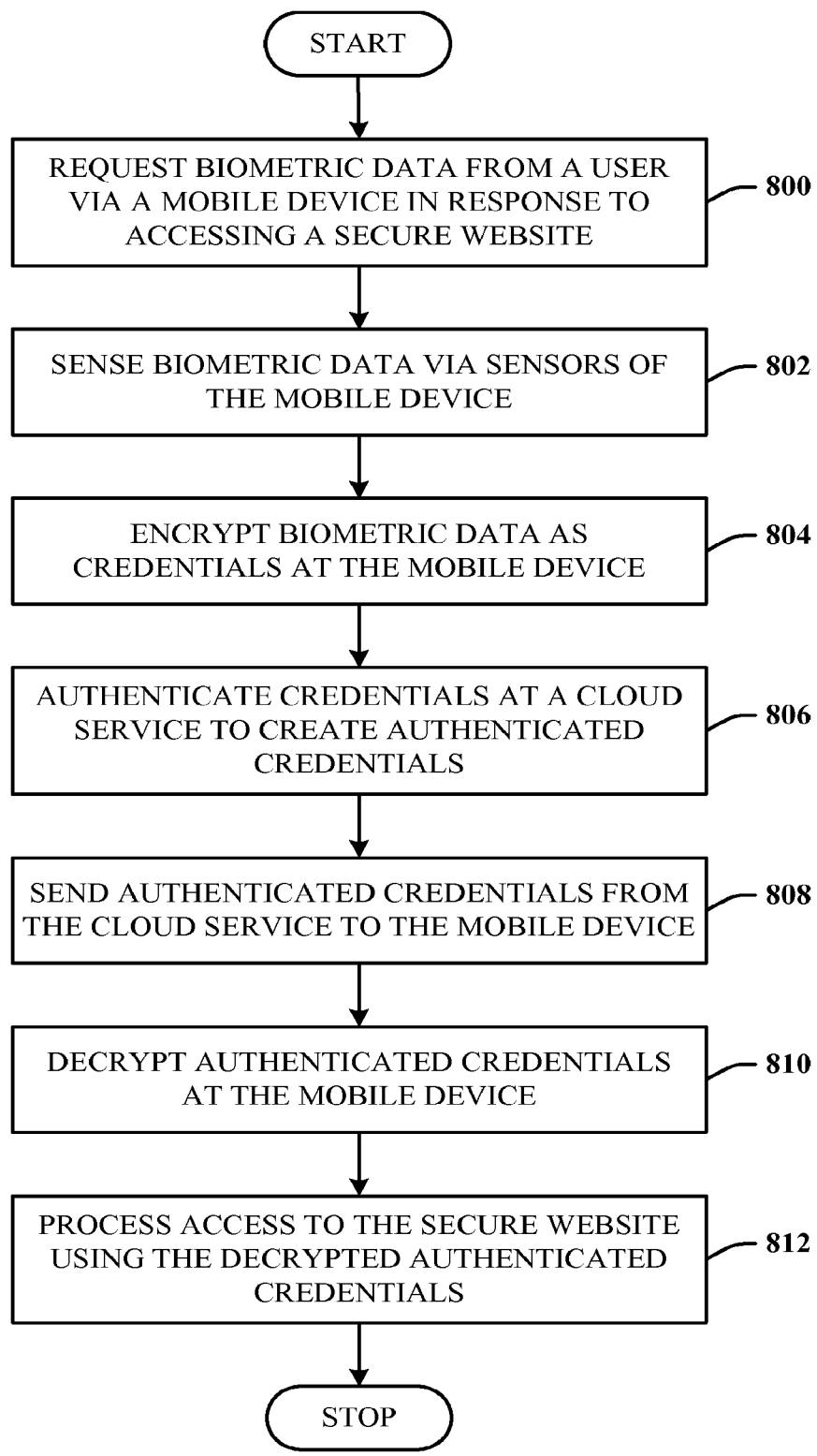
FIG. 8 illustrates a security method in accordance with the disclosed architecture.

FIG. 8 illustrates a security method in accordance with the disclosed architecture. At 800, biometric data of a user is requested via a mobile device in response to accessing a secure website. At 802, the biometric data is sensed via sensors of the mobile device. At 804, the biometric data is encrypted as credentials at the mobile device. At 806, the credentials are authenticated at a cloud service to create authenticated credentials. At 808, the authenticated credentials are sent from the cloud service to the mobile device. At 810, the authenticated credentials are decrypted at the mobile device. At 812, access to the secure website is processed using the decrypted authenticated credentials.

Figure 9:
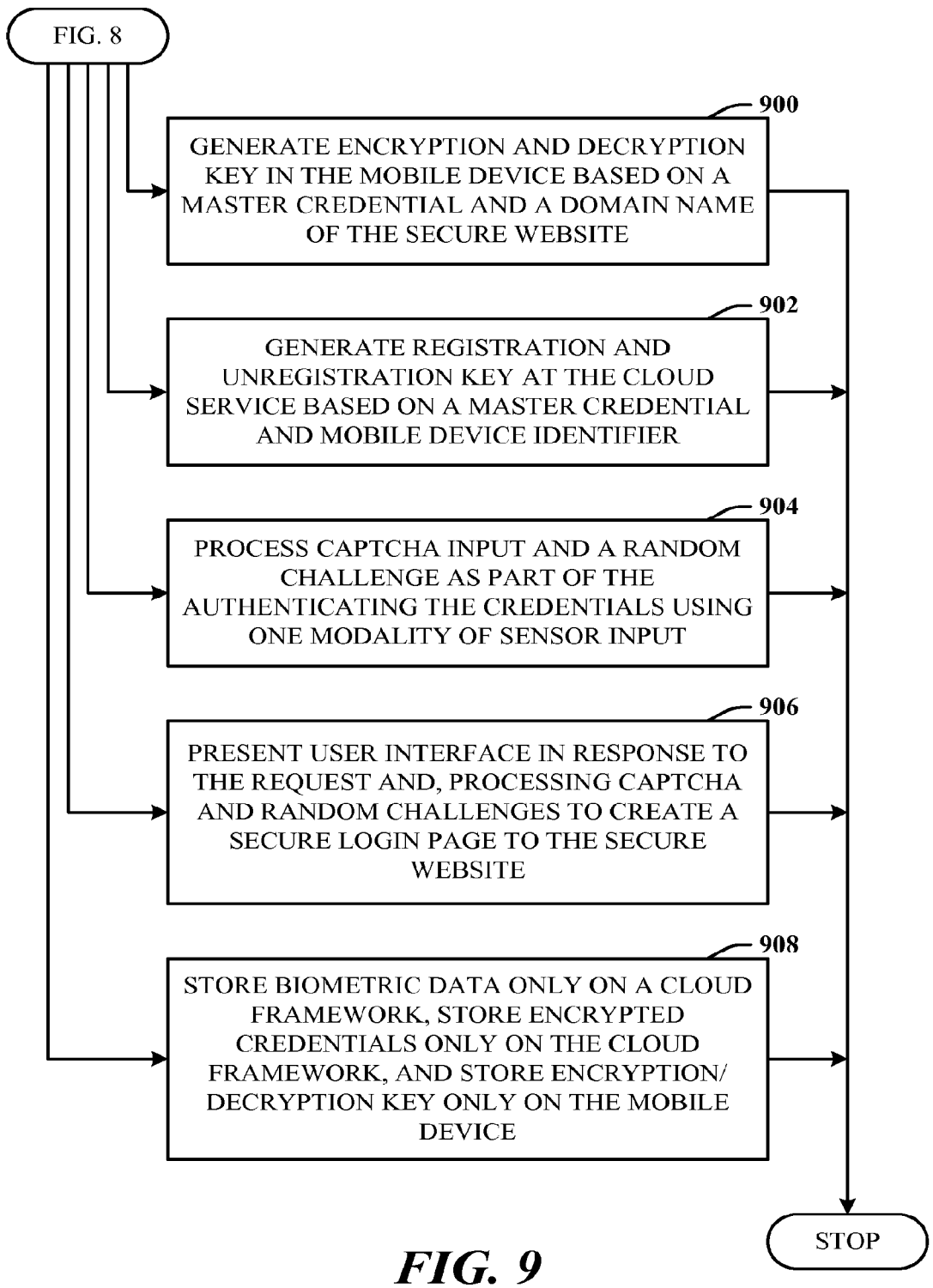
FIG. 9 illustrates further aspects of the method of FIG. 8.

FIG. 9 illustrates further aspects of the method of FIG. 8. Note that the flow indicates that each block can represent a step that can be included, separately or in combination with other blocks, as additional aspects of the method represented by the flow chart of FIG. 8. At 900, an encryption and decryption key is generated in the mobile device based on a master credential and a domain name of the secure website. At 902, a registration and unregistration key is generated at the cloud service based on a master credential and mobile device identifier. At 904, a CAPTCHA input and a random challenge are processed as part of the authenticating the credentials using one modality of sensor input. At 906, a user interface is presented in response to the request and, processing CAPTCHA and random challenges to create a secure login page to the secure website. At 908, the biometric data is stored only on a cloud framework, the encrypted credentials are stored only on the cloud framework, and an encryption/decryption key is stored only on the mobile device.

Figure 10A:
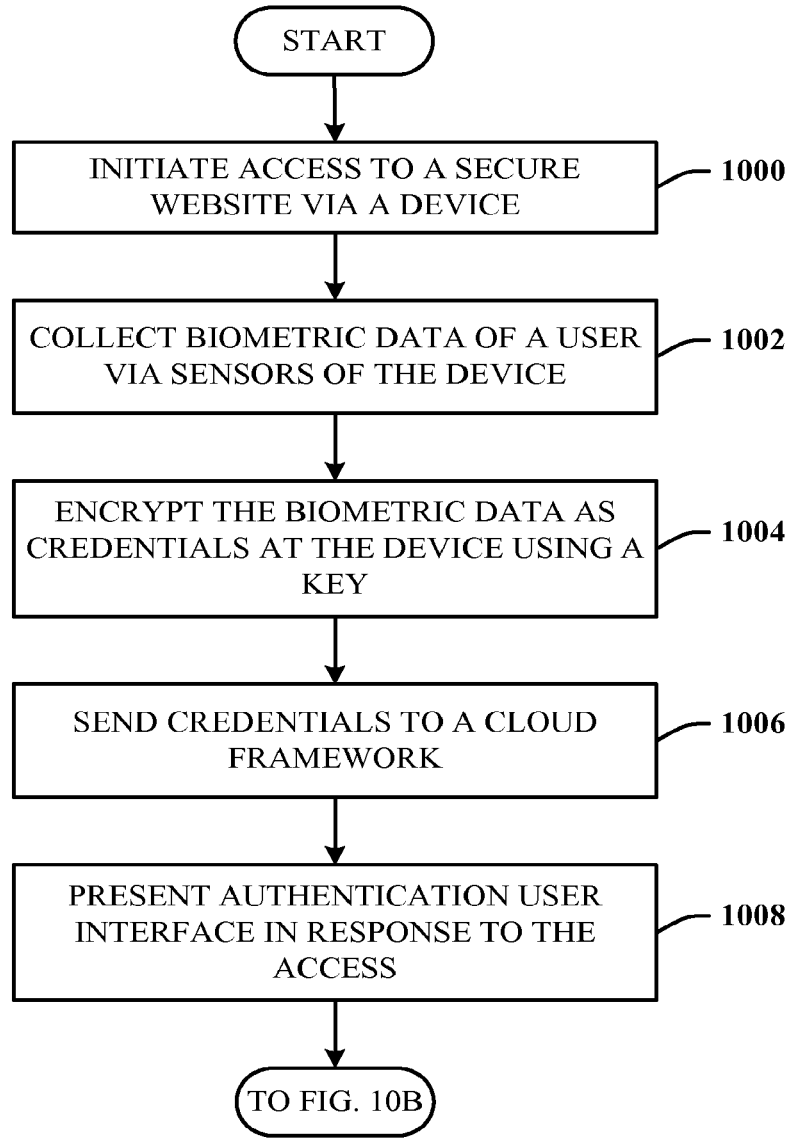
FIG. 10A and FIG. 10B illustrate an alternative security method in accordance with the disclosed architecture.
Figure 10B:
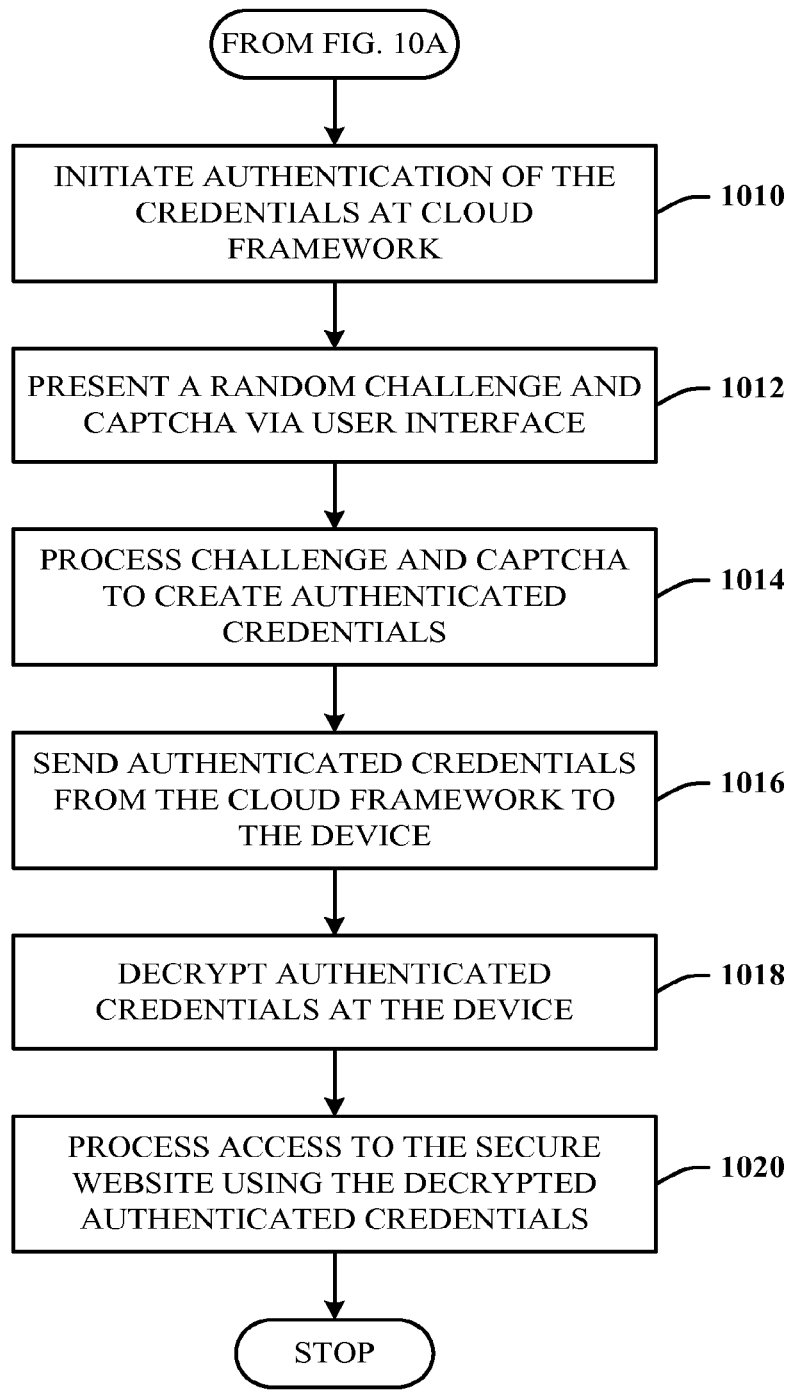

FIG. 10A and FIG. 10B illustrate an alternative security method in accordance with the disclosed architecture. At 1000, access to a secure website is initiated via a device. At 1002, biometric data of a user is collected via sensors of the device. At 1004, the biometric data is encrypted as credentials at the device using a key. At 1006, the credentials are sent to a cloud framework. At 1008, an authentication user interface is presented in response to the access. Continuing to FIG. 10B, at 1010, authentication of the credentials is initiated at the cloud framework. At, 1012, a random challenge and CAPTCHA are presented via the user interface. At 1014, the challenge and CAPTCHA are processed to create authenticated credentials. At 1016, the authenticated credentials are sent from the cloud framework to the device. At 1018, the authenticated credentials are decrypted at the device. At 1020, access to the secure website is processed using the decrypted authenticated credentials.

Figure 11:
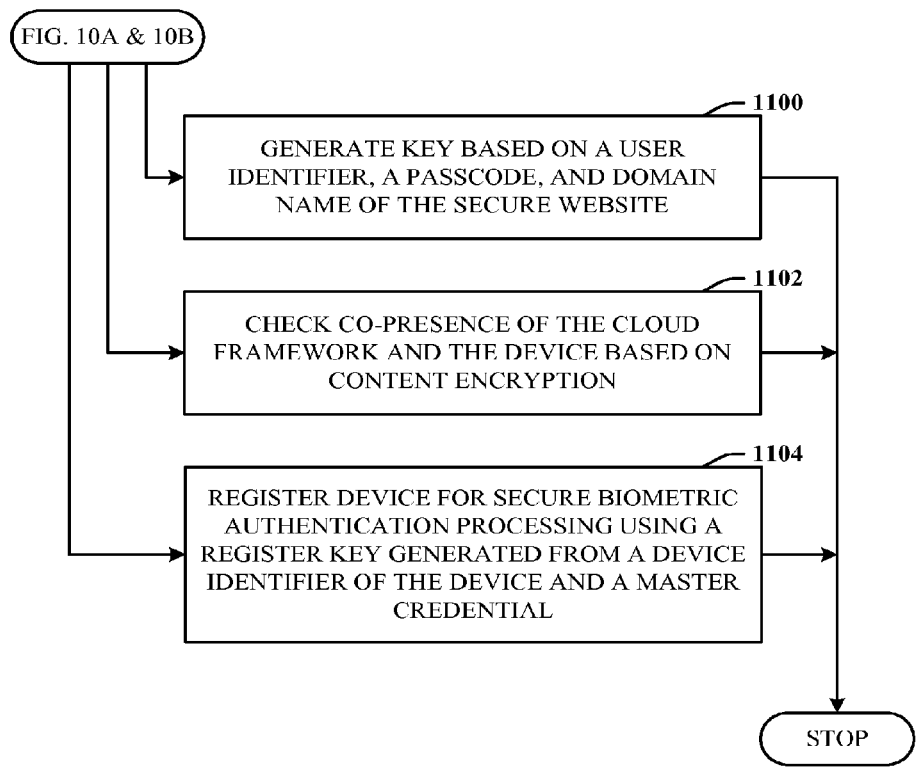
FIG. 11 illustrates further aspects of the method of FIGS. 10A and 10B

FIG. 11 illustrates further aspects of the method of FIGS. 10A and 10B. Note that the flow indicates that each block can represent a step that can be included, separately or in combination with other blocks, as additional aspects of the method represented by the flow chart of FIG. 10. At 1100, the key is generated based on a user identifier, a passcode, and domain name of the secure website. At 1102, co-presence of the cloud framework and the device is checked based on content encryption. At 1104, the device is registered for secure biometric authentication processing using a register key generated from a device identifier of the device and a master credential.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 12:
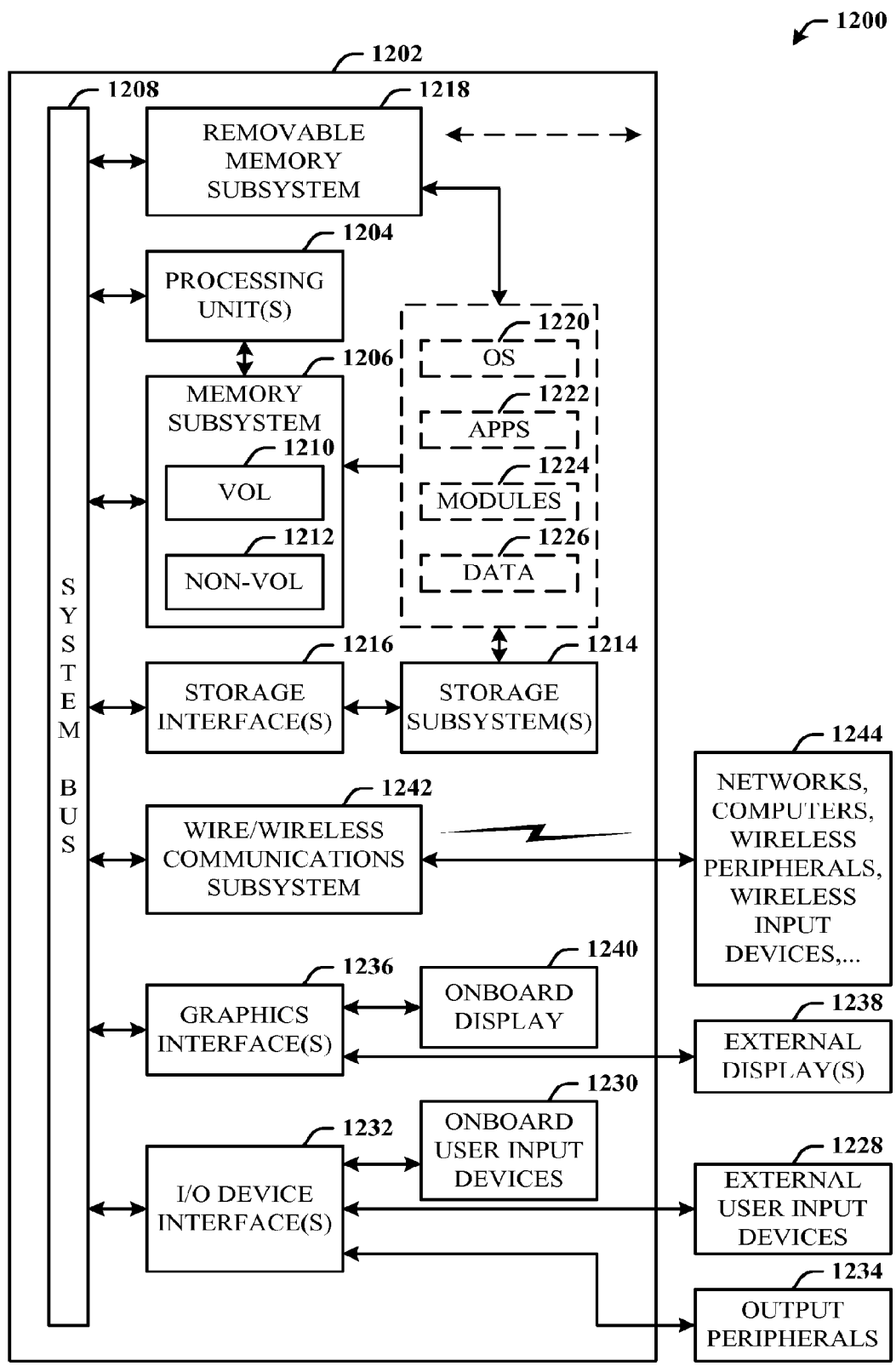
FIG. 12 illustrates a block diagram of a computing system that executes a multi-party security protocol in accordance with the disclosed architecture.

Referring now to FIG. 12, there is illustrated a block diagram of a computing system 1200 that executes a multi-party security protocol in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 12 and the following description are intended to provide a brief, general description of the suitable computing system 1200 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1200 for implementing various aspects includes the computer 1202 having processing unit(s) 1204, a computer-readable storage such as a system memory 1206, and a system bus 1208. The processing unit(s) 1204 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1206 can include computer-readable storage (physical storage media) such as a volatile (VOL) memory 1210 (e.g., random access memory (RAM)) and non-volatile memory (NON-VOL) 1212 (e.g., ROM, EPROM, EEPROM, etc.). A basic input/output system (BIOS) can be stored in the non-volatile memory 1212, and includes the basic routines that facilitate the communication of data and signals between components within the computer 1202, such as during startup. The volatile memory 1210 can also include a high-speed RAM such as static RAM for caching data.

The system bus 1208 provides an interface for system components including, but not limited to, the system memory 1206 to the processing unit(s) 1204. The system bus 1208 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1202 further includes machine readable storage subsystem(s) 1214 and storage interface(s) 1216 for interfacing the storage subsystem(s) 1214 to the system bus 1208 and other desired computer components. The storage subsystem(s) 1214 (physical storage media) can include one or more of a hard disk drive (HDD), a magnetic floppy disk drive (FDD), and/or optical disk storage drive (e.g., a CD-ROM drive DVD drive), for example. The storage interface(s) 1216 can include interface technologies such as EIDE, ATA, SATA, and IEEE 1394, for example.

One or more programs and data can be stored in the memory subsystem 1206, a machine readable and removable memory subsystem 1218 (e.g., flash drive form factor technology), and/or the storage subsystem(s) 1214 (e.g., optical, magnetic, solid state), including an operating system 1220, one or more application programs 1222, other program modules 1224, and program data 1226.

The operating system 1220, one or more application programs 1222, other program modules 1224, and/or program data 1226 can include the entities and components of the system 100 of FIG. 1, the entities and components of the framework 200 of FIG. 2, the entities and components of the system 300 of FIG. 3, the entities and components of the system 400 of FIG. 4, the user interface 500 of FIG. 5, the flow diagrams 600 and 700 of FIGS. 6 and 7, and the methods represented by the flowcharts of FIGS. 8-11, for example.

Generally, programs include routines, methods, data structures, other software components, etc., that perform particular tasks or implement particular abstract data types. All or portions of the operating system 1220, applications 1222, modules 1224, and/or data 1226 can also be cached in memory such as the volatile memory 1210, for example. It is to be appreciated that the disclosed architecture can be implemented with various commercially available operating systems or combinations of operating systems (e.g., as virtual machines).

The storage subsystem(s) 1214 and memory subsystems (1206 and 1218) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 1202 and includes volatile and non-volatile internal and/or external media that is removable or non-removable. For the computer 1202, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 1202, programs, and data using external user input devices 1228 such as a keyboard and a mouse. Other external user input devices 1228 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1202, programs, and data using onboard user input devices 1230 such a touchpad, microphone, keyboard, etc., where the computer 1202 is a portable computer, for example. These and other input devices are connected to the processing unit(s) 1204 through input/output (I/O) device interface(s) 1232 via the system bus 1208, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1232 also facilitate the use of output peripherals 1234 such as printers, audio devices, camera devices, and so on, such as a sound card and/or onboard audio processing capability.

One or more graphics interface(s) 1236 (also commonly referred to as a graphics processing unit (GPU)) provide graphics and video signals between the computer 1202 and external display(s) 1238 (e.g., LCD, plasma) and/or onboard displays 1240 (e.g., for portable computer). The graphics interface(s) 1236 can also be manufactured as part of the computer system board.

The computer 1202 can operate in a networked environment (e.g., IP-based) using logical connections via a wired/wireless communications subsystem 1242 to one or more networks and/or other computers. The other computers can include workstations, servers, routers, personal computers, microprocessor-based entertainment appliances, peer devices or other common network nodes, and typically include many or all of the elements described relative to the computer 1202. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1202 connects to the network via a wired/wireless communication subsystem 1242 (e.g., a network interface adapter, onboard transceiver subsystem, etc.) to communicate with wired/wireless networks, wired/wireless printers, wired/wireless input devices 1244, and so on. The computer 1202 can include a modem or other means for establishing communications over the network. In a networked environment, programs and data relative to the computer 1202 can be stored in the remote memory/storage device, as is associated with a distributed system. It will be appreciated that the network connections shown are exemplary and other means of establishing a communications link between the computers can be used.

The computer 1202 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated and described aspects can be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device comprising:
a hardware processor; and
a hardware computer-readable medium storing computer-executable instructions which, when executed by the hardware processor, cause the hardware processor to:
generate a registration key and an encryption key, the encryption key being associated with a secure destination that is identified by a resource locator;
using the encryption key, encrypt credentials for the secure destination;
provide the encrypted credentials and the registration key to a cloud framework;
store the encryption key locally on the device and remove the registration key from the device;
for a first attempt to access the secure destination:
receive a first random challenge from the cloud framework and output the first random challenge to a user of the device;
obtain, from the user, first biometric data that is responsive to the first random challenge;
provide the first biometric data to the cloud framework and, in response, receive the encrypted credentials;
perform a first access to the secure destination by decrypting the encrypted credentials using the encryption key and sending the decrypted credentials to the secure destination; and
remove the encrypted credentials from the device; and
for a second attempt to access the secure destination:
receive a second random challenge from the cloud framework and output the second random challenge to the user of the device, the second random challenge being different than the first random challenge;
obtain, from the user, second biometric data that is responsive to the second random challenge;

provide the second biometric data to the cloud framework and, in response, receive the encrypted credentials;
perform a second access to the secure destination by decrypting the encrypted credentials using the encryption key and sending the decrypted credentials to the secure destination; and
remove the encrypted credentials from the device.

2. The device of claim 1, wherein the resource locator is a Uniform Resource Locator (URL) and the computer-executable instructions, when executed by the hardware processor, cause the hardware processor to:
use the URL as a seed to generate the encryption key.

3. The device of claim 1, wherein the computer-executable instructions, when executed by the hardware processor, cause the hardware processor to:
obtain a master credential from the user; and
use the master credential in conjunction with the resource locator as seeds to generate the encryption key.

4. The device of claim 3, wherein the computer-executable instructions, when executed by the hardware processor, cause the hardware processor to:
concatenate the master credential and the resource locator together when generating the encryption key to obtain a concatenation of the master credential and the resource locator.

5. The device of claim 4, wherein the computer-executable instructions, when executed by the hardware processor, cause the hardware processor to:
apply a function to the concatenation of the master credential and the resource locator to generate the encryption key.

6. The device of claim 3, wherein the computer-executable instructions, when executed by the hardware processor, cause the hardware processor to:
generate the registration key with the master credential.

7. The device of claim 6, wherein the computer-executable instructions, when executed by the hardware processor, cause the hardware processor to:
generate the registration key using the master credential and a device identifier of the device.

8. The device of claim 7, wherein the computer-executable instructions, when executed by the hardware processor, cause the hardware processor to:
for a third attempt to access the secure destination when the cloud framework does not authenticate third biometric data responsive to a third random challenge and consequently does not provide the encrypted credentials to the device:
obtain the master credential from the user;
derive the registration key using the master credential obtained from the user and the device identifier; and
use the registration key to obtain the encrypted credentials from the cloud framework.

9. A method implemented by a cloud framework, the method comprising:
obtaining, from a client device, encrypted credentials suitable for accessing a secure destination identified by a resource locator and a registration key, wherein the client device does not retain a copy of the registration key after providing the registration key to the cloud framework;
for a first attempt to access the secure destination:
generating a first random challenge for a user of the client device and sending the first random challenge to the client device;

receiving, from the client device, first biometric data responsive to the first random challenge;

attempting to authenticate the first biometric data that is responsive to the first random challenge; and responsive to successful authentication of the first biometric data, sending the encrypted credentials to the client device a first time; and for a second attempt to access the secure destination:

generating a second random challenge for the user of the client device and sending the second random challenge to the client device;

receiving, from the client device, second biometric data responsive to the second random challenge;

attempting to authenticate the second biometric data that is responsive to the second random challenge; and responsive to successful authentication of the second biometric data, sending the encrypted credentials to the client device a second time.

10. The method of claim 9, further comprising:

for a third attempt to access the secure destination when associated third biometric data of the user fails authentication:

verifying the client device using the registration key; and responsive to verification of the client device using the registration key, sending the encrypted credentials to the client device a third time.

11. The method of claim 9, further comprising:

performing freshness checks on the first biometric data and the second biometric data to ensure the first biometric data and the second biometric data are input by the user within a predefined period of time.

12. The method of claim 11, further comprising:

generating different random challenges for multiple subsequent attempts by the user to access the secure destination using the client device;

receiving multiple subsequent instances of biometric data in response to the different random challenges;

sending the encrypted credentials to the client device in response to individual subsequent instances of biometric data that are successfully authenticated; and not sending the encrypted credentials to the client device in response to other subsequent instances of biometric data that are not successfully authenticated.

13. The method of claim 9, further comprising:

for a third attempt to access the secure destination when associated third biometric data of the user fails authentication:

receiving further encrypted credentials from the client device, the further encrypted credentials being encrypted by the registration key;

decrypting the further encrypted credentials using the registration key;

performing a comparison of the decrypted further credentials to a local copy stored by the cloud framework; and in an instance when the comparison is successful, sending the encrypted credentials to the client device a third time.

14. The method of claim 9, wherein the encrypted credentials comprise an encrypted password.

15. A method performed by a computing device, the method comprising:

obtaining credentials for accessing a secure destination identified by a resource locator;

seeding a function with the resource locator to generate an encryption key;

encrypting the credentials with the encryption key;

generating a registration key;

providing the encrypted credentials and the registration key to a cloud framework;

storing the encryption key locally on the computing device while removing the registration key from the computing device;

for a first attempt to access the secure destination:

obtaining a first random challenge and outputting the first random challenge to a user of the computing device;

obtaining, from the user, first biometric data responsive to the first random challenge;

using the first biometric data to retrieve the encrypted credentials from the cloud framework; and decrypting the encrypted credentials using the encryption key and using the decrypted credentials to access the secure destination a first time; and for a second attempt to access the secure destination:

obtaining a second random challenge and outputting the second random challenge to the user of the computing device;

obtaining, from the user, second biometric data responsive to the second random challenge;

using the second biometric data to retrieve the encrypted credentials from the cloud framework; and decrypting the encrypted credentials using the encryption key and using the decrypted credentials to access the secure destination a second time.

16. The method of claim 15, further comprising:

after accessing the secure destination the first time, deleting the encrypted credentials and the decrypted credentials from the computing device while retaining the encryption key on the computing device;

after accessing the secure destination the second time, deleting the encrypted credentials and the decrypted credentials from the computing device again while retaining the encryption key on the computing device; and for a third attempt to access the secure destination, using the registration key to authenticate the user to the cloud framework.

17. The method of claim 16, wherein the first biometric data and the second biometric data comprise voice data.

18. The method of claim 17, wherein the first random challenge identifies one or more first words to be spoken by the user and the second random challenge identifies one or more second words to be spoken by the user.

19. The method of claim 16, wherein the first biometric data and the second biometric data characterize handwriting of the user.

20. The method of claim 15, wherein the credentials comprise a password, the method comprising:

sending the password to the secure destination at the first time and at the second time.

* * * * *